US012573081B2

(12) United States Patent
Blakeslee et al.

(10) Patent No.: US 12,573,081 B2
(45) Date of Patent: Mar. 10, 2026

(54) ONLINE CORRECTION FOR CONTEXT-AWARE IMAGE ANALYSIS FOR OBJECT CLASSIFICATION

(71) Applicant: Rockwell Collins, Inc., Cedar Rapids, IA (US)

(72) Inventors: Brigid A. Blakeslee, Hamden, CT (US); Andrew Radlbeck, South Glastonbury, CT (US); Peggy Wu, Ellicott City, MD (US); Ganesh Sundaramoorthi, Duluth, GA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 306 days.

(21) Appl. No.: 18/216,968

(22) Filed: Jun. 30, 2023

(65) Prior Publication Data
US 2025/0005785 A1     Jan. 2, 2025

(51) Int. Cl.
| | |
|---|---|
| *G06T 7/73* | (2017.01) |
| *B64D 45/00* | (2006.01) |
| *H04N 25/47* | (2023.01) |

(52) U.S. Cl.
CPC ................ *G06T 7/73* (2017.01); *B64D 45/00* (2013.01); *G06T 2207/20081* (2013.01); *G06T 2207/20084* (2013.01); *G06T 2207/30201* (2013.01); *G06T 2207/30232* (2013.01); *H04N 25/47* (2023.01)

(58) Field of Classification Search
CPC ......... A61B 3/113; A61B 5/163; A61B 5/165; A61B 5/18; A61B 5/7267; B64D 45/00; G02B 27/0093; G06F 3/013; G06T 2207/20081; G06T 2207/20084; G06T 2207/30201; G06T 2207/30232; G06T 7/246; G06T 7/73; G06V 20/597; G06V 40/165; G06V 40/171; G06V 40/193; H04N 25/47
See application file for complete search history.

(56) References Cited

U.S. PATENT DOCUMENTS

| | | | |
|---|---|---|---|
| 2005/0137586 A1 | 6/2005 | Gray et al. | |
| 2010/0292545 A1* | 11/2010 | Berka ..................... | A61B 5/374 |
| | | | 600/301 |
| 2015/0338915 A1* | 11/2015 | Publicover ............ | G06F 3/0482 |
| | | | 345/633 |

(Continued)

OTHER PUBLICATIONS

Sujitha Martin et al.,"Monitoring Head Dynamics for Driver Assistance Systems: A Multi-Perspective Approach," Proceedings of the 16th International IEEE Annual Conference on Intelligent Transportation Systems (ITSC 2013), The Hague, The Netherlands, Oct. 6-9, 2013,pp. 2286-2290.*

(Continued)

*Primary Examiner* — Omar S Ismail
(74) *Attorney, Agent, or Firm* — Suiter Swantz IP

(57) ABSTRACT

A computer system records eye tracking data and identifies movements in the eye tracking data to create and iteratively refine associations between eye features and basic geometric shapes. The associations are used to rapidly identify eye features for eye tracking. The system derives performance metrics and fatigue estimations from the identified basic geometric shapes, including changes in such shapes over time. The system continuously adjusts and/or weights the associations in real-time based on eye tracking data.

20 Claims, 3 Drawing Sheets

(56) References Cited

U.S. PATENT DOCUMENTS

| | | | |
|---|---|---|---|
| 2017/0119298 | A1 | 5/2017 | Cheung |
| 2018/0075659 | A1* | 3/2018 | Browy ............... G02B 27/0172 |
| 2018/0189568 | A1* | 7/2018 | Powderly ............. G06V 30/194 |
| 2019/0179409 | A1* | 6/2019 | Jones ................. G02B 27/0172 |
| 2019/0213429 | A1* | 7/2019 | Sicconi ................... G06V 40/18 |
| 2019/0285881 | A1* | 9/2019 | Ilic ......................... G06T 19/006 |
| 2020/0057487 | A1* | 2/2020 | Sicconi ................... G06F 3/011 |
| 2020/0368616 | A1 | 11/2020 | Delamont |
| 2021/0319585 | A1* | 10/2021 | Odobez ................ G06V 40/193 |
| 2022/0108788 | A1* | 4/2022 | Shelton, IV ........... A61B 17/00 |
| 2022/0301217 | A1* | 9/2022 | Stuart ........................ G06T 7/60 |
| 2022/0366874 | A1 | 11/2022 | Grieves et al. |

OTHER PUBLICATIONS

Guang Chen et al.,"EDDD: Event-Based Drowsiness Driving Detection Through Facial Motion Analysis With Neuromorphic Vision Sensor," May 5, 2020,IEEE Sensors Journal, vol. 20, No. 11, Jun. 1, 2020,pp. 6170-6179.*

Qiang Ji et al.,"Real-Time Eye, Gaze, and Face Pose Tracking for Monitoring Driver Vigilance," Real-Time Imaging 8, 357-377 (2002),pp. 357-375.*

Cian Ryan et al.,"Real-time face & eye tracking and blink detection using event cameras," Mar. 27, 2021, Neural Networks 141 (2021),pp. 87-96.*

A. Benoit et al.,"Fusing bio-inspired vision data for simplified high level scene interpretation:Application to face motion analysis," Mar. 4, 2010, Computer Vision and Image Understanding 114 (2010),pp. 774-787.*

Ayman Altameem et al.,"Early Identification and Detection of Driver Drowsiness by Hybrid Machine Learning," Dec. 16, 2021, IEEE Access,vol. 9,2021,pp. 162805-162815.*

Guang Chen et al.,"Event-Based Neuromorphic Vision for Autonomous Driving," Jun. 20, 2020, Autonomous Driving: Part 1,pp. 35-47.*

Jue Li et al.,"Identification and classification of construction equipment operators' mental fatigue using wearable eye-tracking technology," Oct. 31, 2019,Automation in Construction 109 (2020),pp. 1-6.*

Ali Darzii et al.,"Identifying the Causes of Drivers Hazardous States Using Driver Characteristics, Vehicle Kinematics, and Physiological Measurements," Aug. 14, 2018, Frontiers in Neuroscience,vol. 12, Article 568, Aug. 2018, pp. 1-10.*

Naveen Senniappan Karuppusamy et al.,"Multimodal System to Detect Driver Fatigue Using EEG, Gyroscope, and Image Processing," Jul. 24, 2020, IEEEAccess, vol. 8,2020, pp. 129645-129660.*

Guang Chen et al.,"NeuroIV: Neuromorphic Vision Meets Intelligent Vehicle Towards Safe Driving With a New Database and Baseline Evaluations," Feb. 2, 2022, IEEE Transactions on Intelligent Transportation Systems, vol. 23, No. 2, Feb. 2022,pp. 1171-1180.*

Gregor Lenz et al.,"Event-Based Face Detection and Tracking Using the Dynamics of Eye Blinks," Jul. 27, 2020, Frontiers in Neuroscience,vol. 14, Article 587, Jul. 2020, pp. 1-9.*

Ashish Tawari et al.,"Continuous Head Movement Estimator for Driver Assistance: Issues, Algorithms, and On-Road Evaluations," Mar. 28, 2014, IEEE Transactions on Intelligent Transportation Systems, vol. 15, No. 2, Apr. 2014,pp. 818-827.*

Prakash Kanade et al.,"Convolutional Neural Networks (CNN) based Eye-Gaze Tracking System using Machine Learning Algorithm," Apr. 7, 2021, EJECE, European Journal of Electrical Engineering and Computer Science,vol. 5, Issue 2, Apr. 2021, pp. 36-39.*

Shahzeb Ansari et al.,"Driver Mental Fatigue Detection Based on Head Posture Using New Modified reLU-BILSTM Deep Neural Network," Aug. 9, 2022, IEEE Transactions on Intelligent Transportation Systems, vol. 23, No. 8, Aug. 2022,pp. 10957-10962.*

European Extended Search Report received in EP Application No. 24182291.5, Nov. 12, 2024, 8 pages.

* cited by examiner

ONLINE CORRECTION FOR CONTEXT-AWARE IMAGE ANALYSIS FOR OBJECT CLASSIFICATION

BACKGROUND

Fatigue estimation offers insights into a pilot's mental state and can facilitate safe aircraft operation. By extracting eye features that can then be mapped to a fatigue estimate, a pilot monitoring system can implement fatigue monitoring. However, such mapping is based on good models of eye features. Consequently, it would be advantageous if an improved apparatus existed that is suitable for creating and implementing geometric models of eye features for eye tracking and pilot fatigue monitoring.

SUMMARY

In one aspect, embodiments of the inventive concepts disclosed herein are directed to a computer system that records eye tracking data. The system identifies movements in the eye tracking data to create and iteratively refine associations between eye features and basic geometric shapes. The associations are used to rapidly identify eye features for eye tracking.

In a further aspect, the system derives performance metrics and fatigue estimations from the identified basic geometric shapes, including changes in such shapes over time.

In a further aspect, the system continuously adjusts and/or weights the associations in real-time based on eye tracking data.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
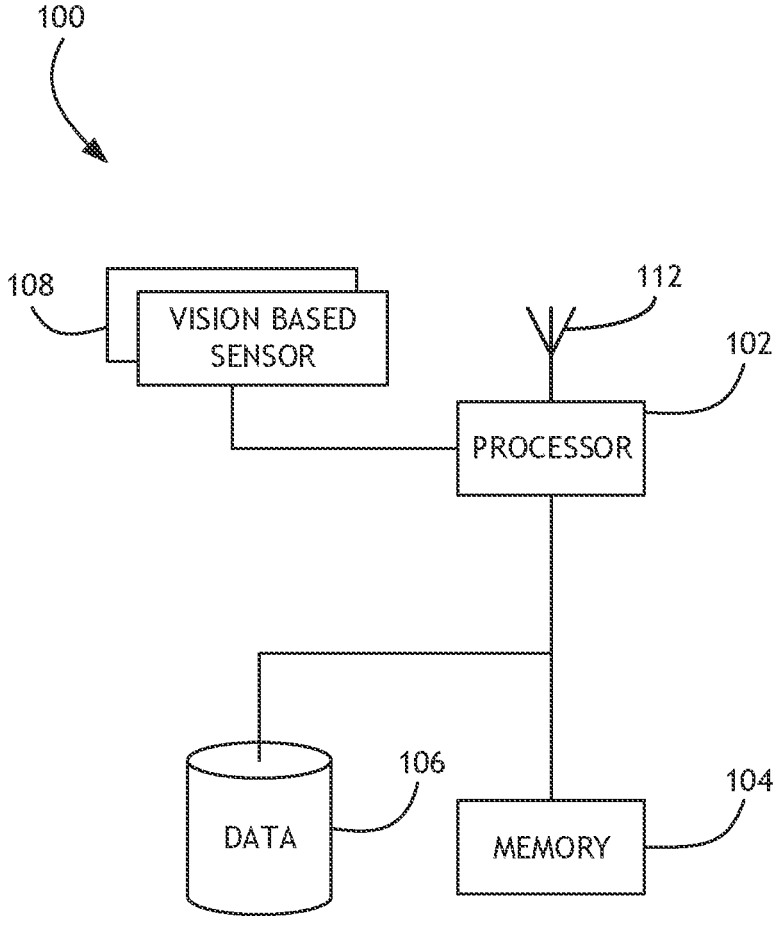
FIG. 1 shows a block diagram of a system suitable for implementing embodiments of the incentive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a computer system that records eye tracking data. The system identifies movements in the eye tracking data to create and iteratively refine associations between eye features and basic geometric shapes. The associations are used to rapidly identify eye features for eye tracking. The system derives performance metrics and fatigue estimations from the identified basic geometric shapes, including changes in such shapes over time. The system continuously adjusts and/or weights the associations in real-time based on eye tracking data.

Referring to FIG. 1, a block diagram of a system 100 suitable for implementing embodiments of the inventive concepts disclosed herein is shown. The system 100 includes a processor 102, memory 104 in data communication with the processor 102 for storing processor executable code, and one or more eye tracking sensors/cameras 108 for receiving eye tracking data stream. The processor executable code configures the processor 102 to continuously receives images from the one or more eye tracking sensors/cameras 108 and performs eye tracking processes, pupil dynamics recognition, eyelid position recognition, and other pose estimations specific to eye tracking.

In at least one embodiment, the processor 102 identifies geometric relationships to eye features for accurate feature extraction. By classifying different eye features according to basic geometric relationships, machine learning algorithms may be employed for rapid pose estimation. Geometric features that may be associated with eye features may include, for example, ellipses associated with the pupil, ellipses or arcs associated with the iris, abstract lines and shapes generally defined by blood vessels, or the like.

In at least one embodiment, the relationships between eye features and fundamental geometries may be defined and stored in a data storage device. The definitions of such relationships may be created or refined via training of a machine learning algorithm based on data received from the one or more eye tracking sensors/cameras 108.

In at least one embodiment, where the relationship between basic geometry and eye features is well defined, the processor 102 may identify shifting geometry over time. For example, relative changes between an ellipse defined by the pupil and arcs defined by the iris may be associated with changing pose estimation.

In at least one embodiment, basic geometric relationships may be applied to support contrast enhancement, image cropping, understanding of distortion on the image appearance and characterization of eye features, and determination of baseline feature appearance for a given subject.

In at least one embodiment, the one or more eye tracking sensors/cameras 108 may comprise neuromorphic (event) cameras. The processor 102 may utilize basic geometric relationships to identify eye features from shifts in the event camera data stream. For example, shifts in the position of a user's pupil may be represented as a shifting boundary between the pupil and iris as seem from the event camera; the shifting boundary may be modeled as a change to basic geometric shape in a plane.

The processor 108 may log the eye tracking data in a data storage element 106. The processor 102 analyzes the eye tracking data to generate/identify basic geometric shapes and model eye movement and pupil dynamics. Identifying relationships between eye features and basic geometric shapes may support pre-processing, filtering, and ultimately classification of different eye features for more accurate feature extraction and fatigue monitoring. Such processes may also support adaptations for different subjects based on observed relationships between different eye features which provides insight as features change over time or in response to increasing fatigue.

Fatigue estimation offers insights into pilot state to support safe aircraft operation. By extracting eye features that can then be mapped to a fatigue estimate, fatigue monitoring is faster and more accurate.

In at least one embodiment, the processor 102 may correlate eye tracking data with discrete portions of a training scenario/task that may be defined by a set of steps stored in the data storage element 106. The processor 102 may define metrics for each step that can be characterized via the eye tracking data with respect to the basic geometric shapes.

In at least one embodiment, the processor 102 transfers the stored eye tracking data and other correlated system and task data to an offline storage device for later analysis and correlation to historic data and other outside factors such as crew rest, crew sleep rhythms, flight schedules, etc. Such transfer may be in real time via the wireless communication device 112.

Figure 2:
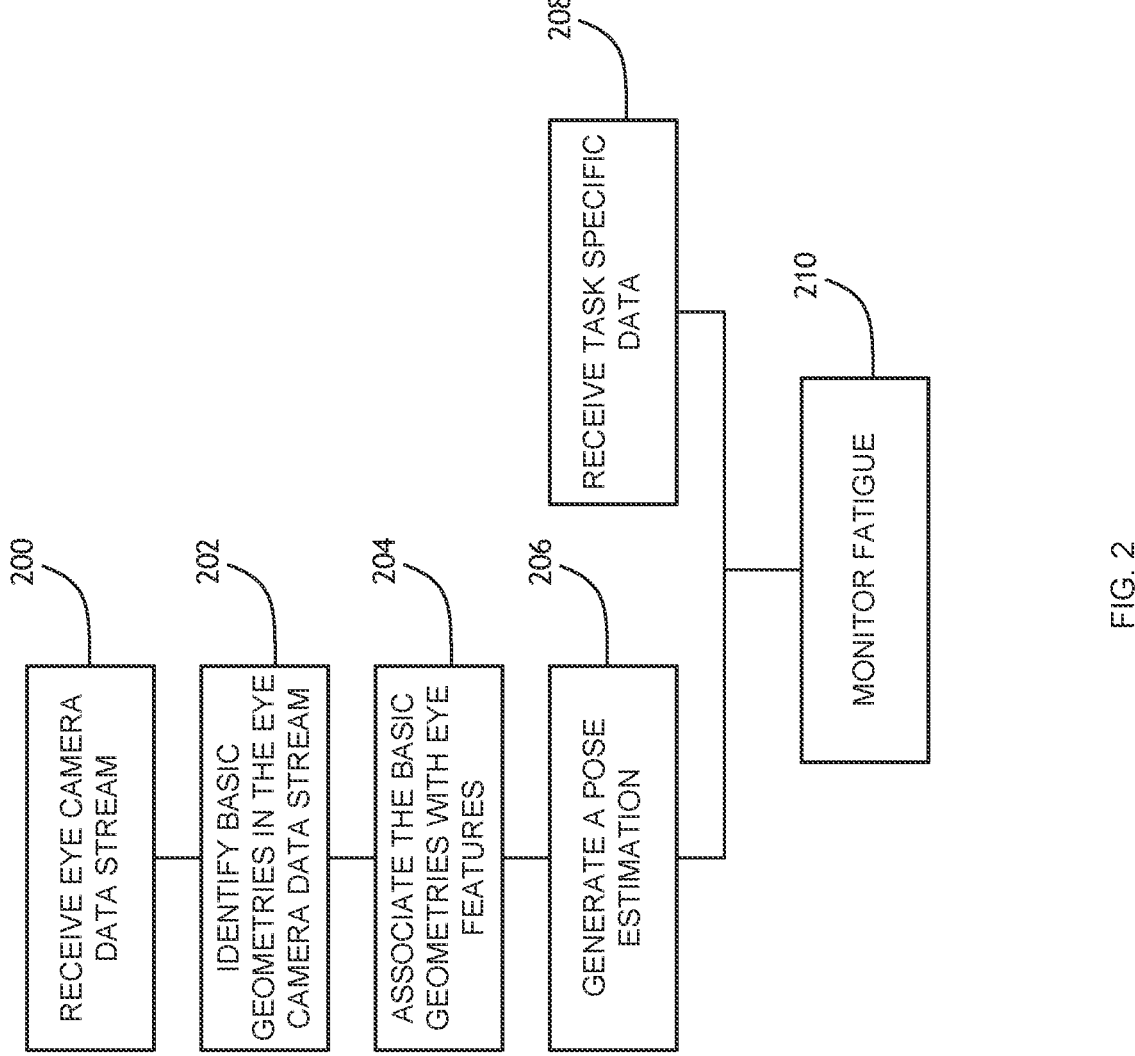
FIG. 2 shows a flowchart of an exemplary embodiment of the inventive concepts disclosed herein.

Referring to FIG. 2, a flowchart of an exemplary embodiment of the inventive concepts disclosed herein is shown. A computer system implementing embodiments of the inventive concepts disclosed herein receives 200 an image stream from one or more vision-based sensors disposed to capture a user's eye. Basic geometric shapes are identified 202 in the image stream, and the basic geometric shapes are associated 204 with eye features. Such association may be a defined algorithm or some trained machine learning algorithm. It may be appreciated that basic geometric shapes may be generally defined (generally applicable to all users, such as ellipses associated with a user's pupil) and/or specific to the user (such as shapes defined by a specific user's blood vessels).

In at least one embodiment, basic geometric shapes may be identified from events in an event camera stream. Changes in eye features may be generally represented by edges and surfaces that can be closely correlated to such basic geometric shapes.

The computer system uses the basic geometric shapes to generate 206 a pose estimate of the user's eye. Basic geometric shapes may allow for quicker, more accurate pose estimates. The computer system may utilize the pose estimate for fatigue monitoring 210. In at least one embodiment, the computer system may also receive 208 certain task specific data that can be correlated to the eye tracking data for fatigue monitoring such as through a trained machine learning algorithm.

Figure 3:
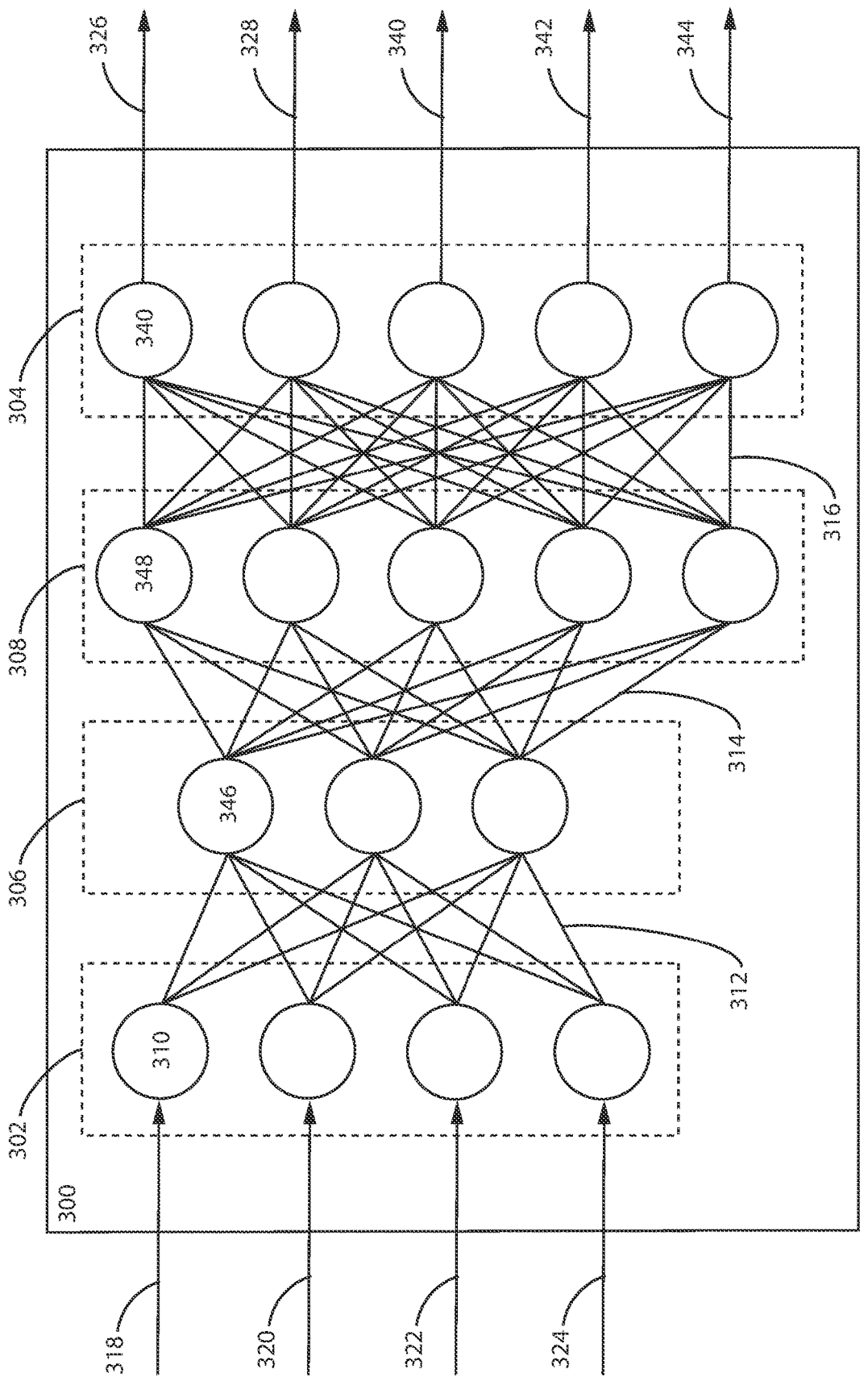
FIG. 3 shows a block diagram of a neural network according an exemplary embodiment of the inventive concepts disclosed herein.

Referring to FIG. 3, a block diagram of a neural network 300 embodying a pre-processing algorithm associating eye features to basic geometric shapes according an exemplary embodiment of the inventive concepts disclosed herein is shown. The neural network 300 comprises an input layer 302 that receives external inputs (including eye tracking data, avionics data, and potentially user or task specific profiles), an output layer 304, and a plurality of internal layers 306, 308. Each layer comprises a plurality of neurons or nodes 310, 336, 338, 340. In the input layer 302, each node 310 receives one or more inputs 318, 320, 322, 324 corresponding to a digital signal and produces an output 312 based on an activation function unique to each node 310 in the input layer 302. An activation function may be a Hyperbolic tangent function, a linear output function, and/or a logistic function, or some combination thereof, and different nodes 310, 336, 338, 340 may utilize different types of activation functions. In at least one embodiment, such activation function comprises the sum of each input multiplied by a synaptic weight. The output 312 may comprise a real value with a defined range or a Boolean value if the activation function surpasses a defined threshold. Such ranges and thresholds may be defined during a training process. Furthermore, the synaptic weights are determined during the training process.

Within the context of the present application, synaptic weights are determined, at least in part, from training data derived from actual eye tracking data recorded during a training scenario or task. The eye tracking data is correlated to the task, and potentially to deviations from predefined expected movements. During training, synaptic weights are iteratively computed and tested against separate data sets.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one eye tracking camera; and
at least one processor in data communication with a memory storing processor executable code,
wherein the processor executable code configures the at least one processor to:
receive an image stream from the at least one eye tracking camera;
identify a plurality of basic geometric shapes in the image stream; and
generate a pose estimate from the plurality of basic geometric shapes.

2. The computer apparatus of claim 1, wherein the processor executable code further configures the at least one processor to generate a fatigue estimate based on the pose estimate.

3. The computer apparatus of claim 2, wherein:
the processor executable code further configures the at least one processor to receive task specific data; and
generating the fatigue estimate is based on the task specific data.

4. The computer apparatus of claim 3, wherein the at least one processor is configured as a trained neural network configured to receive the basic geometric shapes and task specific data as inputs.

5. The computer apparatus of claim 1, wherein the at least one eye tracking camera comprises a neuromorphic event camera.

6. The computer apparatus of claim 5, wherein the basic geometric shapes are defined by at least an interface between eye features.

7. The computer apparatus of claim 1, wherein the processor executable code further configures the at least one processor to record the image stream and basic geometric shapes in a training set of data for a machine learning algorithm.

8. A method comprising:
receiving an image stream from at least one eye tracking camera;
identifying a plurality of basic geometric shapes in the image stream; and
generating a pose estimate from the plurality of basic geometric shapes.

9. The method of claim 8, further comprising generating a fatigue estimate based on the pose estimate.

10. The method of claim 9, further comprising receiving task specific data, wherein generating the fatigue estimate is based on the task specific data.

11. The method of claim 10, further comprising instantiating a trained neural network configured to receive the basic geometric shapes and task specific data as inputs.

12. The method of claim 8, wherein the at least one eye tracking camera comprises a neuromorphic event camera.

13. The method of claim 12, wherein the basic geometric shapes are defined by at least an interface between eye features.

14. The method of claim 8, further comprising recording the image stream and basic geometric shapes in a training set of data for a machine learning algorithm.

15. A pilot fatigue monitoring system comprising:
at least one eye tracking camera; and
at least one processor in data communication with a memory storing processor executable code,
wherein the processor executable code configures the at least one processor to:
receive an image stream from the at least one eye tracking camera;
identify a plurality of basic geometric shapes in the image stream;
generate a pose estimate from the plurality of basic geometric shapes; and
generate a fatigue estimate based on the pose estimate.

16. The pilot fatigue monitoring system of claim 15, wherein:
the processor executable code further configures the at least one processor to receive task specific data; and
generating the fatigue estimate is based on the task specific data.

17. The pilot fatigue monitoring system of claim 16, wherein the at least one processor is configured as a trained neural network configured to receive the basic geometric shapes and task specific data as inputs.

18. The pilot fatigue monitoring system of claim 15, wherein the at least one eye tracking camera comprises a neuromorphic event camera.

19. The pilot fatigue monitoring system of claim 18, wherein the basic geometric shapes are defined by at least an interface between eye features.

20. The pilot fatigue monitoring system of claim 15, wherein the processor executable code further configures the at least one processor to record the image stream and basic geometric shapes in a training set of data for a machine learning algorithm.

* * * * *